No. 821,222. PATENTED MAY 22, 1906.
G. H. & E. C. COIT.
COW TAIL FASTENER.
APPLICATION FILED AUG. 17, 1905.

Witnesses

George H. Coit
Earl C. Coit
Inventors by C. A. Snow & Co.
Attorneys

UNITED STATES PATENT OFFICE.

GEORGE H. COIT AND EARL C. COIT, OF BRECKENRIDGE, MISSOURI.

COW-TAIL FASTENER.

No. 821,222.　　　Specification of Letters Patent.　　　Patented May 22, 1906.

Application filed August 17, 1906. Serial No. 274,575.

*To all whom it may concern:*

Be it known that we, GEORGE H. COIT and EARL C. COIT, citizens of the United States, residing at Breckenridge, in the county of Caldwell and State of Missouri, have invented a new and useful Cow-Tail Fastener, of which the following is a specification.

This invention relates to devices for holding cows' tails during milking or at other approved times.

The object of the invention is to provide a device of the class embodying new and improved features of simplicity, cheapness, durability, and convenience.

A further object of the invention is to provide a device of the class having an approximately circular opening between the jaws, which being located near the pivot is subjected to more tension than the regular jaws, and which may be used to encircle the tail of a vicious animal when the regular jaws will not hold it.

A further object of the invention is to provide a device of the class embodying means for attachment to a wire or other cable in position for use upon any of a row of cows and without attaching to the leg.

With these and other objects in view the present invention consists in the combination and arrangement of parts, as will be hereinafter fully described, shown in the accompanying drawings, and particularly pointed out in the appended claim, it being understood that changes in the form, proportion, size, and minor details may be made without departing from the spirit or sacrificing any of the advantages of this invention.

Figure 1:
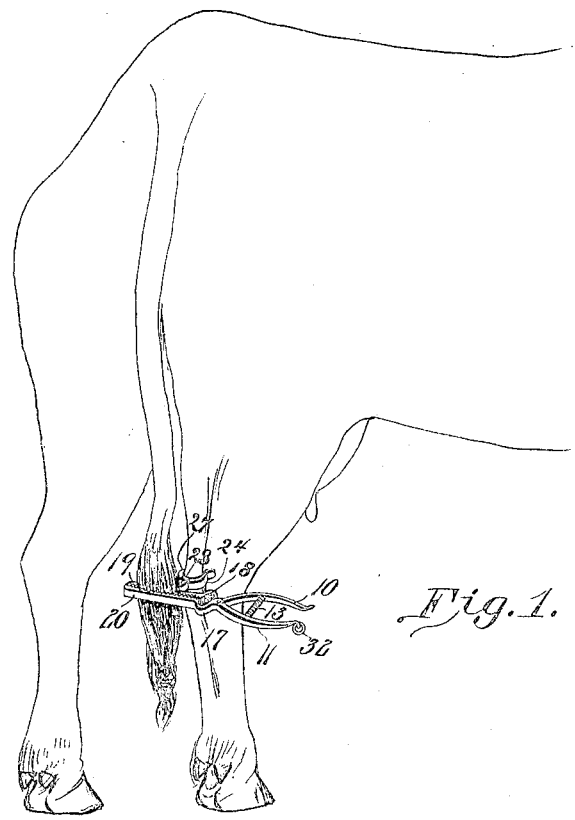
Figure 2:
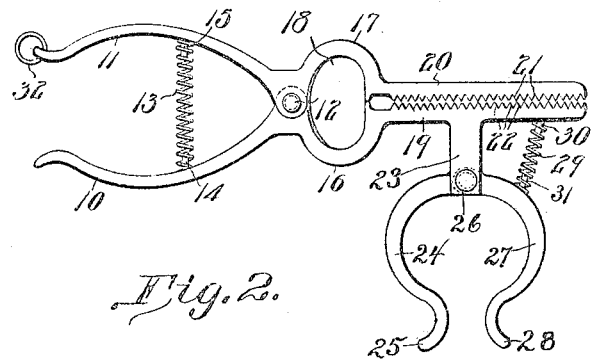

In the drawings, Figure 1 is a perspective view of the improved tail-holder applied. Fig. 2 is a view of the improved tail-holder in side elevation.

Like characters of reference indicate corresponding parts in both figures of the drawings.

In its preferred embodiment the improved tail-fastener forming the subject-matter of this application comprises a pair of handles 10 and 11, pivoted together at 12 and having a spring 13 therebetween engaged upon studs 14 and 15. Opposite the pivot 12 the handles 10 and 11 are continued, respectively, by outwardly-curved integral portions 16 and 17, forming therebetween an approximately circular opening 18. Integral with the curved portions 16 and 17, respectively, are the jaws 19 and 20, disposed normally adjacent and parallel and provided with serrated faces 21 and 22, respectively. Rigid upon or integral with the jaw 19 is an outstanding bar 23, continued by a curved arm 24 and terminating in a sharply-outlined guide 25. To the bar 23 is pivoted at 26 a curved arm 27, formed similarly to the arm 24 and ending in an outlined guide 28, similar and opposed to the guide 25. Between the jaw 19 and the pivoted arm 27 is disposed a spring 29, engaged at each end upon studs 30 and 31, integral, respectively, with the jaw and the arm. At the extremity of one of the handles, as 11, is mounted a ring 32, in which may be engaged a cord or other cable for suspending the device above a row of cows.

It will be understood that the device is used by placing the guides 25 and 28 against the "hamstring" of a cow above the hock, and by a pushing movement and by reason of the shape of the guides the curved arms are separated against the tension of the spring 29 and the arms automatically snap over and embrace the cord above the hock. The tail is then secured by pressing together the handles 10 and 11, thus opening the jaws 19 and 20, and the tail clamped therebetween. If the animal is vicious or for any reason the tail is not securely held by the hairy part being clamped between the serrated faces 21 and 22, the fleshy part may be embraced within the opening 18, which being nearer the pivot exerts a greater pressure and owing to its circular form engages the tail more evenly.

For use in stables a wire or other cable may be suspended horizontally above a row of cows and the device suspended from a ring thereon, as by a rope. With the fastener suspended it may be used to hold the tails of each cow in the row without the trouble of attaching it to the leg. When so suspended the fastener is in position to remain from one milking to the next and cannot become misplaced.

Having thus described the invention, what is claimed is—

A cow-tail fastener comprising a pair of pivoted handles, one of which has a ring in the end, a spring disposed between the handles, a pair of opposing serrated jaws each rigidly secured to one handle by an outwardly-curved portion forming an approximately circular opening between the jaws and the pivot, a leg-embracing clamp rigidly secured to one jaw, and comprising a bar and a rigid curved arm, a similarly-curved arm pivoted to the rigid arm, a spring bearing against the jaw and the pivoted arms and sharply-outturned guides upon the extremities of the curved arms.

In testimony that we claim the foregoing as our own we have hereto affixed our signatures in the presence of two witnesses.

GEORGE H. COIT.
EARL C. COIT.

Witnesses:
THOMAS J. GOINS,
FRED. B. HURD.